Patented June 25, 1929.

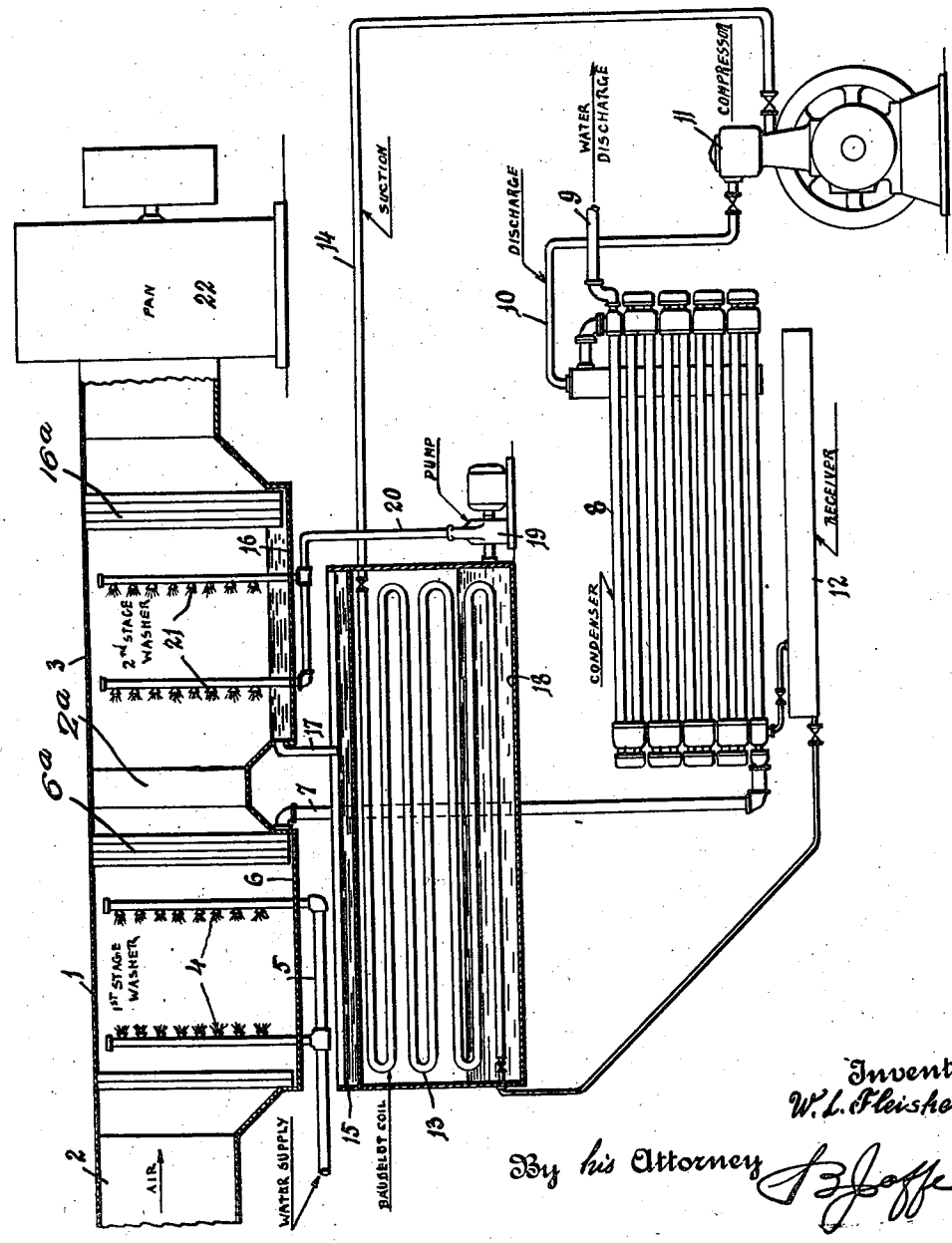

1,718,815

UNITED STATES PATENT OFFICE.

WALTER L. FLEISHER, OF NEW YORK, N. Y., ASSIGNOR, BY MESNE ASSIGNMENTS, TO AUDITORIUM VENTILATING CORPORATION, OF JERSEY CITY, NEW JERSEY, A CORPORATION OF NEW JERSEY.

METHOD AND APPARATUS FOR COOLING AIR.

Application filed December 22, 1926. Serial No. 156,320.

This invention relates to ventilation and more particularly, to a system designed to maintain a desired standard of both temperature and humidity conditions within an enclosure. It is particularly adapted for the ventilation of public enclosures such as theatres.

The proper ventilation of a building in the summer time is largely a question of cooling and dehumidifying and, with certain types of buildings such, for example, as theatres during operation, this is true even in the winter time, since the heat and humidity given off by the occupants are in many cases more than sufficient to maintain the proper conditions of humidity and temperature.

It is in the cooling and dehumidification, however, that ventilation becomes, in practice, most expensive. It is an object of this invention to ventilate an enclosure efficiently and adequately but with a minimum of expense.

The dehumidification of air by cooling involves the reduction of the air to its dew point before the extraction of moisture begins, and then the further reduction of the saturated air to a new dew point with a consequent condensation of the surplus moisture and a surrender of the latent heat contained therein. One of the simplest methods of effecting this reduction in temperature and this extraction of heat is by spraying the air with cold water. This is, moreover, a feasible and practical plan if a plentiful water supply be available of sufficiently low temperature. Ordinarily, however, such a water supply is not available:—either the water has too high a temperature or else there is not a sufficient quantity available or, more commonly, both limitations exist. In such instances mechanical refrigeration may be used artificially to cool the water used for spraying the air. In this manner the dehumidification is no longer limited by the temperature of an outside supply, and the temperature of the spray may be accurately maintained with a consequent accurate maintenance of the humidity of the issuing air. Furthermore, the use of artificial refrigeration makes the system no longer dependent on a large water supply, since it is possible to re-use the water coming from the spray chamber by returning it to the refrigerating machine. With such a system, however, it will be evident that the entire heat absorption is taken up by the refrigerating machinery, with a consequent low efficiency.

Where air and water are brought into extensive contact, as where the air is subjected to the action of a fine water spray, the heat interchange between them is substantially complete, corresponding to an efficiency of 100%.

Refrigeration, however, involves the conversion of the heat units into mechanical power and the production of the refrigerating effect from the mechanical power, a conversion which can seldom, if ever, exceed an efficiency of 20%.

It is an object of this invention to obtain the stabilization of conditions and the humidity control which mechanical refrigeration makes possible, while at the same time utilizing, in so far as possible and at the maximum efficiency, the cooling effect of the natural water supply.

Refrigerating machinery ordinarily includes a cooling coil, as for example a condenser for the purpose of cooling and condensing compressed gases preparatory to expansion, and there is ordinarily supplied to the condenser a quantity of circulating water from a natural water supply as, for example, from deep wells or from city mains, and this water supply is frequently below the dew point of the incoming air.

In accordance with this invention it has been discovered that the refrigeration can be conducted more efficiently without increase in water consumption by combining the natural water spray chamber system with the mechanical refrigeration system in a novel manner. In accordance with this invention the natural water supply is first brought into direct contact with the air to be dehumidified in a spray chamber until the air has been reduced substantially to the temperature of the water. Thereafter the water from the spray chamber is utilized as a cooling medium for the condenser. In accordance with this system a small difference in temperature between the water supply and the dew point of the air, the water being the cooler, will produce a very great effect in in dehumidification, whereas the consequent rise in temperature of the cooling water as it is taken to the condenser, while it tends to produce an adverse effect upon the efficiency of refrigeration is, in fact, more than counterbalanced by other concomitant factors of economy. Obviously the initial spray will produce its cooling effect whenever it is below the wet bulb temperature of the incoming air. The greatest economies occur, however, in situations where cooling water is available having a temperature below and preferably substantially below the dew point of the incoming air. For example, suppose the incoming air to have a wet bulb temperature of 78 degrees with 70% humidity (dew point 75 degrees) and it be desired to maintain within the building a dry bulb temperature of 75 degrees with a 50% humidity corresponding to a wet bulb temperature of 62½ (dew point 55 degrees). Under such circumstances no precipitation of moisture will occur from the air until the temperature has been brought below 75°, but thereafter a very appreciable precipitation occurs for each degree drop in temperature. Under such circumstances a very appreciable saving can be made by a direct spray system if, for example, cooling water be available at 65°.

For a fuller understanding of the nature and objects of the invention reference should be had to the following detailed description taken in connection with the accompanying drawing, in which: the drawing is a diagrammatic section through an apparatus embodying this invention.

In the embodiment illustrated of the apparatus, by which the process may be carried out, there are provided two stages of washing of the air having a natural water supply for the first stage, together with means for artificially cooling the spray water used in the second stage. The cooling apparatus illustrated is in the form of a conventional refrigerating machine, including a condenser and a Baudelot expansion tube and means for imparting the refrigeration to the cooling water. Water from the general supply is fed to the first stage washer and thence it is used to cool the condenser, while the water for the second stage washer comprises a substantially closed circuit to and from the refrigerating machine.

The first stage washer comprises a chamber 1 having an inlet for the air at 2 and an outlet at 2ª which is directly connected to and serves as the inlet for the second stage washer 3. Within the chamber is provided a plurality of sets of spray nozzles 4 which are connected by suitable conduit 5 to the general water supply, such for example, as the city water supply or a well pump, as desired. The water from the spray nozzles is collected in a pan 6 at the bottom of the chamber 1 which communicates by a pipe 7 with the condenser 8. Suitable eliminators 6ª may be provided within the chamber for preventing the carrying over of moisture from the first stage sprays into the second stage. The condenser itself may comprise a plurality of double-walled tubes, the interior of which carries the condensing water, the annular passage being used for the compressed gases. The cooling water is discharged through an outlet 9.

The refrigerating system comprises, in general, a compressor 11 feeding the compressed gases to the condenser 8 through a conduit 10 for condensation, the condensed liquid being led to a receiver 12, whence it is discharged to the Baudelot coil. This Baudelot coil may be situated within a vessel 18 in which it is brought in contact with the water circulated through the second stage washer. As illustrated, this vessel comprises an upper chamber 15 having a perforated bottom through which the water is discharged upon the Baudelot coil to be cooled, thereby collecting in the bottom of the vessel 18.

The second stage washer is, in general, similar to the first, comprising as it does a chamber 3 in which are enclosed the sets of spray nozzles 21 which receive their water through a conduit 20 from the pump 19 connected to the bottom of the vessel 18. The spray water discharged from the second stage, collecting in the bottom 16 of the vessel 3, is fed to the upper chamber 15 of the vessel 18 through pipes 17. The second stage washer may also have a plurality of eliminator plates 16ª to remove surplus moisture from the air before the air is admitted to the ventilating system by the fan 22.

By this apparatus it will be seen that the incoming air is first cooled in the first spray chamber, substantially to the temperature of the condenser water, which water is then utilized in the cooling of the compressed gasses before being discharged to waste through the duct 9. The second spray chamber, however, is fed with water in a closed refrigerated circulating system, the temperature of which determines the quantity of moisture in the outgoing air in the well-known manner.

The system herein outlined is applicable for dehumidification of the air in an enclosure to be ventilated either directly or as a part of any organized system of ventilation, since the apparatus and process herein disclosed primarily relate to the dehumidification system in itself. It will be obvious that the foregoing system utilizes the cooling effect of the cooling water to the maximum and at its greatest efficiency.

As an example of the economies which may be effected in accordance with this invention we may assume an outside wet bulb temperature of 78 degrees (dew point 75°) and a cooling water temperature of 65 degrees, and assuming that it is desired to maintain within the theater a temperature of 75 degrees dry bulb with a 50% relative humidity (dew point 55°). If we employ direct refrigeration to cool the water of a spray, we will require 1/7 of a ton of refrigerating effect for each ten persons in the room, corresponding to about 2/7 of a gallon of water. Now assume the same conditions to be met in accordance with this invention by utilizing this same quantity of condenser water directly in a spray chamber through which the air to be cooled is circulated before the water is taken to the condenser. We may, by this procedure, bring the incoming air down to a dew point of substantially 70 degrees, with a removal of 20 grains of moisture per pound. The air thus partially cooled is then passed through a spray of refrigerated water. This requires in the refrigerator system only 65% of the refrigerating effect which was formerly required. The condenser water, coming from the first stage washer, has a temperature of substantially 70 degrees instead of 65.

It is to be noted, however, that if the refrigeration be reduced as hereinbefore suggested in accordance with this invention without a corresponding reduction in the water supply, that the relatively larger quantity of condensed cooling water will compensate in condensing effect for the fact that it is now delivered at a higher temperature, so that the preliminary use of the water in the spray chamber does not interfere with the efficiency of the refrigerating system.

This system, therefore, makes it possible to employ a smaller refrigerating system and a consequent smaller power consumption than has been possible heretofore, for the same effect, without any increase in water consumption. It will be obvious that these may be so operated as to effect a saving in water supply if desired.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim—

1. A system of air cooling which comprises two stages of spray washers, a refrigerating unit including a water condenser for cooling the water for the second stage washer and means for circulating the water of the first stage washer through the water condenser.

2. An air cooling system comprising in combination a spray washer, a second spray washer, a refrigerating unit including a water condenser for cooling the spray of the second washer and means for circulating the water from the first washer through the condenser of the refrigerating unit.

3. In a method of air cooling with a system employing a refrigerating unit including a water condenser, steps which consist in circulating the air through a non-refrigerated spray then through a refrigerated spray, collecting the non-refrigerated spray and circulating it through the condenser of the refrigerating unit.

4. In a method of air cooling, steps which consist in circulating the air through a non-refrigerated spray of water then through the refrigerated spray of water and utilizing the water from a non-refrigerated spray for obtaining the refrigerated spray.

5. In a device of the character described, in combination, an apparatus for cooling air by means of a cold water supply, a refrigerating apparatus including a heat dissipating cooling coil, means for further cooling the said current of air by said refrigerating apparatus and means for cooling said cooling coil by the cold water supply from said first mentioned apparatus.

6. A device of the character described including, in combination, means for cooling a current of air by contacting it directly with a supply of cold water, and means for absorbing further heat from said air including a refrigerating unit utilizing said water supply.

7. In an apparatus of the character described, means for cooling air including a spray chamber, a closed water circulating system for said spray chamber including a refrigerating apparatus and means for initially reducing the temperature of the air by a natural water supply utilized in the refrigerating apparatus.

8. A method of cooling air comprising the absorption of heat therefrom by direct contact with a water supply cooled by artificial refrigeration and the preliminary cooling of the air by a natural water supply used for cooling in the refrigerating system.

9. In a method of cooling air with a system embodying a refrigerating unit and including a heat dissipating means, the steps which include circulating the air to be cooled through a spray of water, using the said water in the heat dissipating means of the refrigerating unit and subsequently circulating the air into heat interchanging relation with the refrigerating unit.

WALTER L. FLEISHER.